United States Patent [19]
Riedl

[11] 4,356,736
[45] Nov. 2, 1982

[54] IMBALANCE-OSCILLATION EXCITER

[75] Inventor: Franz Riedl, Munich, Fed. Rep. of Germany

[73] Assignee: Wacker-Werke GmbH & Co. KG, Munich, Fed. Rep. of Germany

[21] Appl. No.: 127,755

[22] Filed: Mar. 6, 1980

[30] Foreign Application Priority Data

Mar. 9, 1979 [DE] Fed. Rep. of Germany ....... 2909204

[51] Int. Cl.[3] ........................................ F16H 33/00
[52] U.S. Cl. ........................................ 74/61; 74/87
[58] Field of Search ...................... 74/61, 87; 173/49; 209/366.5, 367; 198/770; 404/117

[56] References Cited

U.S. PATENT DOCUMENTS

| | | | |
|---|---|---|---|
| 2,410,170 | 10/1946 | Lazan | 74/61 |
| 2,930,244 | 3/1960 | Hutchinson et al. | 74/61 |
| 3,287,983 | 11/1966 | Austin et al. | 74/61 |
| 3,465,599 | 9/1969 | Hennecke et al. | 74/61 |
| 3,564,932 | 2/1971 | Lebelle | 173/49 |
| 3,704,631 | 12/1972 | Marka | 74/61 |
| 3,814,532 | 6/1974 | Barrett et al. | 74/61 |
| 3,878,733 | 4/1975 | Tertinek | 74/61 |
| 4,108,009 | 8/1978 | Fuchigami | 74/61 |

FOREIGN PATENT DOCUMENTS

| | | | |
|---|---|---|---|
| 186105 | 7/1956 | Austria | 74/61 |
| 1845195 | 9/1961 | Fed. Rep. of Germany . | |
| 1078058 | 10/1962 | Fed. Rep. of Germany . | |
| 2409417 | 9/1975 | Fed. Rep. of Germany . | |
| 1051483 | 3/1964 | United Kingdom | 74/87 |

*Primary Examiner*—Lawrence J. Staab
*Attorney, Agent, or Firm*—Becker & Becker, Inc.

[57] ABSTRACT

An imbalance oscillation exciter having two imbalance weights arranged on each of two axially parallel or coaxial imbalance-weight carriers positively rotatably coupled with one another and rotating counter to each other or in the same direction. At least one of these imbalance-weight carriers comprises a shaft, whereby the imbalance-weight carriers are coupled with each other by a hub for continuous opposite rotation for the purpose of changing the phase position of the imbalance weights. A pin fixed on the shaft slidably engages in a hub groove. The pin is shiftable along a shaft slot extending at an incline to the hub groove by means of an adjustment member arranged coaxially in the shaft. The shaft has an axially parallel cylinder chamber open toward one of its end faces and in which the adjustment member is slidable with a piston extension sealed with respect thereto and facing the open side of the cylinder chamber. Pressure medium is supplied from the open side by way of a pressure medium chamber fixed in the housing and sealingly surrounding the pertaining shaft end and being applied against the mechanical back or reaction pressure of the piston extension. The rise or angle of inclination between the hub groove and the shaft slot, the direction of inclination, and the direction of rotation of the shaft may be so matched or adapted with respect to each other that the back or reaction pressure results from the torque transmitted by the pin.

1 Claim, 1 Drawing Figure

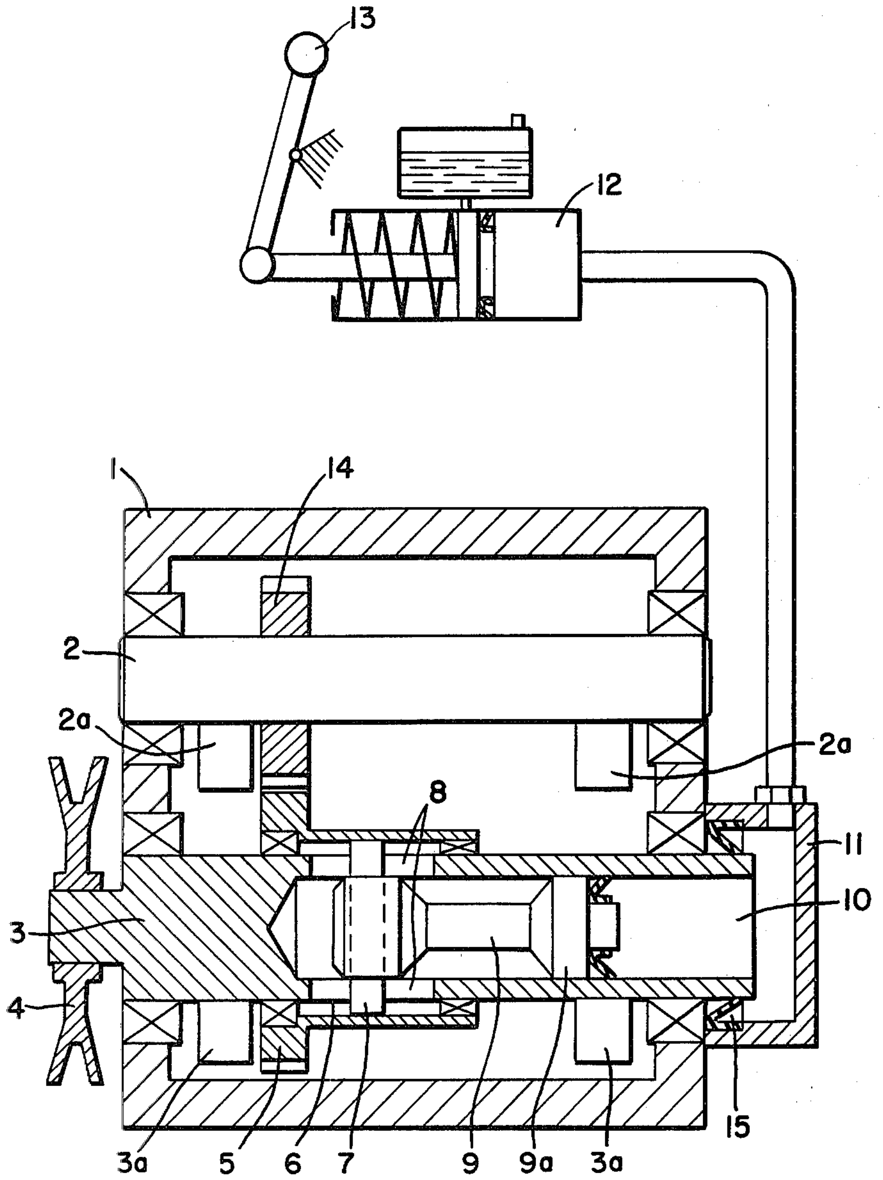
13
12
1
14
2
2a
2a
8
11
10
3
4
15
3a
5
6
7
9
9a
3a

IMBALANCE-OSCILLATION EXCITER

The present invention relates to an oscillation exciter or oscillator with two counter-balance or imbalance weights on each of two axially parallel or coaxial imbalance-weight carriers rotatably positively coupled with one another and rotating counter to each other or in the same direction. At least one of these imbalance-weight carriers comprises a shaft, whereby the imbalance-weight carriers are coupled with one another by a hub for continuous counter-rotation for the purpose of changing the phase position of the imbalance weights. The hub is rotatably arranged on the shaft but is fixed axially. A hub groove which extends along the shaft is provided in that wall of the hub which surrounds the shaft. A pin is fixed against rotation with respect to the shaft and slidably engages in the hub groove. By means of an adjustment member arranged coaxially in the shaft, the pin is shiftable in a shaft slot extending at an incline to the hub groove and along the shaft.

With the known oscillation exciters according to the description of German disclosure No. 24 09 417, the adjustment member comprises an adjustment axle or spindle arranged coaxially in the shaft and projecting from the end face thereof. The adjustment axle or spindle is adjustable in the axial direction of the shaft by an adjustment element rotatably coupled therewith. The coupling passes over a roller bearing which is very strongly stressed or loaded by the vibration and as a consequence of the normally high speed of such oscillation exciters, and therefore is subjected to considerable wear. Additionally, the adjustment axle or spindle and the bearing must be especially well sealed off against the penetration of dust and other contamination; this sealing-off is problematical with the bearing because of the high speed. Also the seals are especially subjected to a considerable wear, and must be prematurely replaced.

The object of the present invention is to embody an oscillation exciter of the aformentioned general type in such a way that a precise force transfer is possible from the adjustment element to the pin without the necessity of installing structural parts which are sensitive to wear and which bring about sealing-off problems, and without any noteworthy greater expense than with the previously known oscillation exciters.

This object, and other objects and advantages of the present invention, will appear more clearly from the following specification in connection with the accompanying drawing, which illustrates an embodiment in which an oscillation exciter is shown in a longitudinal section, whereby the emitter or output side of the hydraulic linkage is only schematically illustrated.

The oscillation exciter of the present invention is characterized primarily in that the shaft has an axially parallel cylinder chamber open toward one of its end surfaces and in which the adjustment member is slidable with a piston extension sealed off with respect thereto and facing the open side of the cylinder chamber and relative to which pressure medium is supplied from the open side, against mechanical back or reaction pressure from the piston extension, from a pressure medium chamber that is stationary or rigid with respect to the housing and sealed off relative to as well as surrounding the pertaining shaft end.

Imbalance oscillation exciters with adjustable imbalance weights with which the imbalance adjustment occurs hydraulically are already known. These known imbalance exciters have means for adjustment which are basically and generically different from the oscillation exciter means according to the present invention, and with these, in any event, however, a back and forth movable adjustment member is provided for the adjustment. This adjustment member with the known hydraulically adjustable oscillation exciters (so far as a concrete configuration of the hydraulic adjusting means is set forth) is respectively operated by means of a double-acting, hydraulic working cylinder which makes the entire construction of the particular oscillation exciter considerably more complicated because of the separate pressure medium chambers existing with such working cylinders for advancing and retracting stroke, and for each working chamber a separate conduit or passage guidance is required for the pressure medium, in other words, all together two pressure medium conduits leading to different locations. The known oscillation exciters are consequently also built relatively large (German Gebrauchsmuster No. 1 845 195 and German patent disclosure No. 1 078 058).

In comparison with the present inventive imbalance exciter the force transfer from the actuating element to the pin occurs by way of a simple-operating hydraulic linkage that does not require great structural complexity either from a receiving standpoint or from an output standpoint, whereby the pressure medium chamber simultaneously produces a complete or 100% sealing-off of the pertaining shaft end against the environment, this end being particularly endangered because of the installed adjustment member. For this reason, relatively simple sealing means can be installed for the sealing between the shaft and the pressure medium chamber since the sealing means, with a predetermined wear, in any event lead only to leakage oil loss from the hydraulic linkage which for a long time remains within acceptable limits and can easily be compensated for on the output or emitting side.

Pursuant to a further embodiment of the present invention, the angle of inclination between the hub groove and the shaft slot, the direction of inclination, and the direction of rotation of the shaft are so adapted or matched with respect to each other that the back or reaction pressure results from the torque transmitted by the pin. The foregoing represents a further improvement of the inventive features, and advantageously eliminates the installation of special means for generating the back or reaction pressure, such as springs or the like.

Referring now to the drawing in detail, the oscillation exciter has a housing 1 in which two shafts 2 and 3 are journalled parallel to each other by means of roller bearings. These shafts 2 and 3 support the imbalance weights 2*a* and 3*a*. The shaft 3 is driven with a motor by way of a V-belt pulley 4, and is positively coupled with the shaft 2 by gears 5 and 14.

To adjust the phase position of the imbalance weights 2*a* and 3*a* in relation to each other, the gear 5 is arranged adjustable within limits yet fixed against rotation relative to the shaft 3. For this purpose, a hub is connected between the shaft 3 and the gear 5. This hub has a groove 6 extending in a helical or spiral shape with the sample embodiment. A pin 7, which passes at right angles through and is fixed with respect to the shaft 3, engages the groove 6 and is shiftable in a shaft slot 8 axially parallel to the shaft 3. During shifting of this pin, the hub is rotated within limits with respect to the shaft 3 to the extent of the rise or inclination of the spiral groove 6. This leads to the desired change of the phase position.

The adjustment of the pin 7 is provided by an adjustment member 9, which is slidable in a cylinder chamber 10 coaxially provided in the shaft 3; the cylinder chamber is open toward the right end face of the shaft as seen in the drawing. The adjustment member 9 has a piston extension 9*a* which faces the open side of the cylinder chamber 10 and is sealed off with respect thereto. The piston extension 9*a* is engageable with pressure medium from the open side of the shaft 3. The pressure medium is supplied to the piston extension 9*a* from a pressure medium chamber 11 fixed in the housing and sealingly surrounding a pertaining shaft end; the pressure medium is supplied by means of a sender or transmitter means 12, against back or reaction pressure from the piston extension in conformity with the actuation of the operating element 13. The back or return pressure is maintained without special additional means thereby that the inclination angle between the hub groove 6 and the shaft slot 8, the direction of inclination, and the direction of rotation of the shaft 3 are matched or adapted with respect to each other in such a way that a force resulting from the torque transmitted by the pin 7 tends to press the adjustment member 9 to the right, as seen in the drawing, whereby this force is expressed in the back or reaction pressure upon the pressure medium to the right of the piston extension 9*a*.

The sealing of the right end of the shaft 3 against the environment or surroundings is taken care of by the pressure medium chamber 11. Accordingly, the seal 15 only has to hinder or preclude the discharge or leakage of the pressure medium, which at no time is at a high pressure, from the pressure medium chamber 11 into the chamber surrounded by the housing 1. Relatively simple seals are suitable for this purpose.

The present invention is, of course, in no way restricted to the specific disclosure of the specification and drawing, but also encompasses any modifications within the scope of the appended claims.

What I claim is:

1. An oscillation exciter, which comprises in combination:

a housing;

two at least axially parallel imbalance-weight carriers rotatably journalled in said housing and rotatably positively coupled with one another, each of said carriers being provided with two imbalance weights, and at least one of said carriers comprising a shaft;

a hub on one of said shafts for effecting coupling of said carriers for continuous counter rotation for changing the phase position of said imbalance weights, said hub being rotatably arranged on said shaft yet being fixed axially, said hub being provided, in that wall thereof which surrounds said shaft, with a hub groove which extends along said shaft, said shaft being provided with a shaft slot extending along said shaft at an incline to said hub groove;

a pin passing substantially at right angles through, and fixed against rotation with respect to, said shaft, said pin slidably engaging said hub groove and shiftable in said shaft slot;

an adjustment member arranged coaxially in said shaft for effecting shifting of said pin, said shaft having an axially parallel cylinder chamber open towards one end face of said shaft, said adjustment member having a piston extension facing the open side of said cylinder chamber and sealed off relative thereto, said adjustment member and said piston extension being slidable in said cylinder chamber; and a pressure-medium chamber fixed to said housing and sealed off relative to as well as surrounding the cylinder chamber end of said shaft, said pressure-medium chamber serving for supplying pressure medium from said open side of said cylinder chamber to said piston extension for moving said piston extension in a first direction, movement of said piston extension in the opposite direction being effected by mechanical back or reaction pressure generated as a result of the angle and direction of inclination of said hub groove relative to said shaft slot and the direction of rotation of said shaft.

* * * * *